United States Patent
Alhussein et al.

(10) Patent No.: US 12,289,251 B2
(45) Date of Patent: Apr. 29, 2025

(54) METHOD AND APPARATUS FOR MANAGING NETWORK TRAFFIC VIA UNCERTAINTY

(71) Applicant: HUAWEI TECHNOLOGIES CO., LTD., Shenzhen (CN)

(72) Inventors: Omar Ahmad Mohammad Alhussein, Ottawa (CA); Mehdi Arashmid Akhavain Mohammadi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 306 days.

(21) Appl. No.: 17/568,893

(22) Filed: Jan. 5, 2022

(65) Prior Publication Data
US 2023/0216811 A1 Jul. 6, 2023

(51) Int. Cl.
*H04L 47/70* (2022.01)
*H04L 41/14* (2022.01)
*H04L 41/147* (2022.01)
*H04L 47/12* (2022.01)

(52) U.S. Cl.
CPC .......... *H04L 47/823* (2013.01); *H04L 41/145* (2013.01); *H04L 41/147* (2013.01); *H04L 47/12* (2013.01)

(58) Field of Classification Search
CPC ... H04L 47/823; H04L 41/145; H04L 41/147; H04L 47/12; H04L 41/142; H04L 47/127; H04L 47/83
See application file for complete search history.

(56) References Cited

U.S. PATENT DOCUMENTS

| | | |
|---|---|---|
| 9,439,081 B1 | 9/2016 | Knebl et al. |
| 2016/0352584 A1 | 12/2016 | Roy |
| 2018/0248768 A1* | 8/2018 | Ibrahim Rana ......... H04L 41/12 |
| 2021/0117792 A1* | 4/2021 | Ahuja .................... G06N 3/045 |
| 2023/0194279 A1* | 6/2023 | Kakosyan ............... H04L 67/52 |
| | | 701/411 |

FOREIGN PATENT DOCUMENTS

| | | |
|---|---|---|
| WO | 2020121084 A1 | 6/2020 |
| WO | 2021242151 A1 | 12/2021 |
| WO | WO-2023012141 A1 * | 2/2023 |

OTHER PUBLICATIONS

A. Kendall and Y. Gal, "What uncertainties do we need in bayesian deep learning for computer vision?," arXiv preprint arXiv:1703.04977, 2017.
V. Nguyen et al. "Epistemic uncertainty sampling," in International Conference on Discovery Science, Springer. Aug. 31, 2019.

* cited by examiner

Primary Examiner — Fadi Haj Said

(57) ABSTRACT

There is provided a method and system for communication network management. There is provided an active TE architecture and procedure that rely on the epistemic uncertainty obtained from traffic forecasting models. According to embodiments, the traffic forecasting models can predict the mean of the network traffic demand and can extract one or more of the features relating epistemic uncertainty and the aleatoric uncertainty. According to embodiments, the epistemic uncertainty is used to vary the sampling frequency of network statistics in TE applications, for specific times or specific flows. A time-window can be used to predict network traffic can be varied (e.g. increased or decreased) to adjust the epistemic uncertainty.

25 Claims, 10 Drawing Sheets

METHOD AND APPARATUS FOR MANAGING NETWORK TRAFFIC VIA UNCERTAINTY

CROSS-REFERENCE TO RELATED APPLICATIONS

This is the first application filed for the present invention.

FIELD

The present disclosure pertains to the field of network traffic engineering and in particular to a method and apparatus for managing network traffic in a communication network.

BACKGROUNDS

Traffic Engineering (TE) is a process of steering the network traffic across the network for more efficient use of network resources and to provide a level of protection against delay or failure of the network nodes and/or links. Network operators may manage and guide network traffic as part of network management. Management and guidance of network traffic is needed as network traffic varies with time and there are often unexpected or sudden network traffic volume peaks, for example bursty network traffic, with unpredictable patterns. For example, to address network traffic congestion, network operators use enablers such as TE tunnels or segment routing to steer network traffic away from the congested area in the network and forward this network traffic towards its respective final destination. An example of resource reservation protocol traffic engineering (RSVP-TE) is illustrated in FIG. 1A.

In TE, a traffic forecasting module and a traffic routing/planning module are two important components. A traffic forecasting module predicts the (future) demand or network flow in the network based on network flow statistics collected from the network. The prediction may be provided either per switch, per link or per flow. Then, based on the prediction and other network information, the traffic routing/planning module decides how to steer and forward traffic in the network.

However, these continue to be several sources of uncertainty when TE is considered.

Therefore there is a need for a method and apparatus for managing network traffic in a network, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for managing network traffic in a network. In accordance with embodiments of the present disclosure, there is provided a method for managing network traffic in a communication network. The method includes receiving, by a controller node from a traffic forecasting model, a predictive mean of network traffic demand, an aleatoric uncertainty ($\sigma_n^2$) associated with the network traffic demand and an epistemic uncertainty ($\sigma_m^2$) associated with the network traffic demand. The method further includes reserving, by the controller node, network resources based on a function of the predictive mean ($\mu$), the aleatoric uncertainty ($\sigma_n^2$) and the epistemic uncertainty ($\sigma_m^2$). The method additionally includes varying, by the controller node, a sampling frequency of network statistics for a specific time-period or a network flow based at least in part based on the epistemic uncertainty ($\sigma_m^2$).

In some embodiments, the method further includes determining, by the controller node, a forecasting and planning horizon based on one or more of the epistemic uncertainty ($\sigma_m^2$) and the aleatoric uncertainty ($\sigma_n^2$) such that an overall weighted uncertainty of the traffic forecasting model is below a threshold, the forecasting and planning horizon indicative of a time period for which the traffic forecasting model is applicable. In some embodiments, the sampling frequency is increased upon determination that the epistemic uncertainty is greater than the threshold and the sampling frequency is decreased upon determined that the epistemic uncertainty is lower than the than the threshold. In some embodiments, the threshold is dynamic. In some embodiments, the overall weighted uncertainty is defined by $\gamma_1 \sigma_m^2 + \gamma_2 \sigma_n^2$, wherein each of $\gamma_1$ and $\gamma_2$ is a scalar coefficient.

In some embodiments, varying a sampling frequency is at least in part determined based on a threshold associated with the epistemic uncertainty.

In some embodiments, the traffic forecasting model receives the network statistics from a traffic engineering (TE) database (TE-DB), the network statistics collected from the communication network.

In some embodiments, varying the sampling frequency includes updating a TE database (TE-DB) containing the network statistics collected from the communication network.

In some embodiments, the controller node utilizes a constrained shortest path first (CSPF) module and a configuration and management system (CMS), wherein setting resource reservations includes utilizing the CSPF module and the CMS to configure tunnels with resource reservations based on the function of the predictive mean ($\mu$), the aleatoric uncertainty ($\sigma_n^2$) and the epistemic uncertainty ($\sigma_m^2$).

In some embodiments, the network statistics are transmitted from a TE database (TE-DB) to an offline training and model search module for training of the traffic forecasting model.

In some embodiments, the traffic forecasting model is a Bayesian or probabilistic traffic forecasting model.

In some embodiments, the function is defined by $\mu + \alpha \sigma_m^2 + \beta \sigma_n^2$, wherein each of $\alpha$ and $\beta$ is a scalar coefficient.

In accordance with embodiments of the present disclosure, there is provided an apparatus for managing network traffic in a communication network. The apparatus includes at least one processor and at least one machine-readable medium storing machine executable instructions. The machine executable instructions, when executed by the at least one processor configure the apparatus to perform one or more of the methods defined above.

In accordance with embodiments of the present disclosure, there is provided a non-transitory computer-readable medium storing machine executable instructions. The machine executable instructions, when executed by a processor of a device for managing traffic in a communication network, configure the device to perform one or more of the methods defined above.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which:

FIG. 10 illustrates an example of TE forecasting and planning horizon with a TE framework according to embodiments of the present disclosure.

It will be noted that throughout the appended drawings, like features are identified by like reference numerals.

DETAILED DESCRIPTION

Figure 1A:
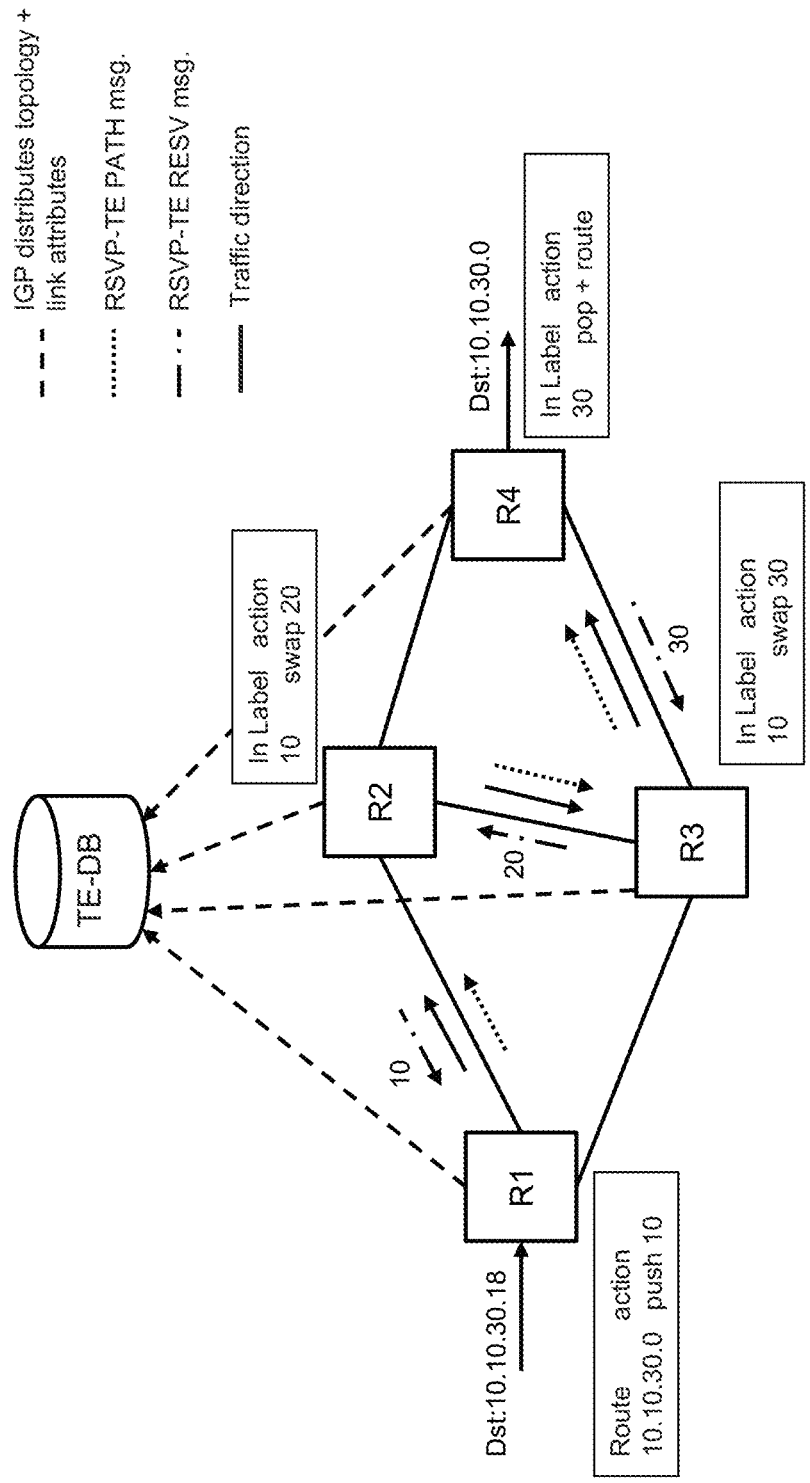
FIG. 1A illustrates an example of RSVP TE.

The present disclosure provides a method and system or framework for managing and guiding network traffic in a network based on network traffic demand uncertainty. The traffic demand uncertainty may be extracted from the Bayesian/probabilistic traffic forecasting models or other suitable network traffic forecasting model. Bayesian/probabilistic traffic forecasting models can be generated out of Bayesian neural networks that are extending standard networks with posterior inference for controlling or preventing data overfitting. In Bayesian neural networks, everything has a probability distribution attached thereto, including model parameters, for example weights and biases in neural networks.

In network traffic engineering applications, there are two main sources of uncertainty, namely aleatoric uncertainty and epistemic uncertainty. Aleatoric uncertainty can be considered to be random uncertainty. Epistemic uncertainty may also be called systematic uncertainty and can be considered to be reflective of model or epistemological inaccuracies for example. While there is a lot of existing work, for example relevant TE literature, focusing on the aleatoric uncertainty, there has been no attempt to quantify the epistemic uncertainty and additionally separate the aleatoric uncertainty and the epistemic uncertainty. It has been realised that there is no known TE work that builds a TE framework that involves actions or procedures to deal with the epistemic uncertainty.

According to embodiments, there is provided an active and adaptive traffic forecasting or traffic engineering (TE) framework that considers network uncertainty, for example uncertainty in network traffic demand, for TE in the core network, such as in multiprotocol label switching TE (MPLS-TE). In various embodiments, frequency of state updates or soft-updates (for example TE database updates) can be autonomously varied and adjusted by relying on epistemic uncertainty in network traffic demand, in order to enhance sampling operation. According to embodiments, among two different types of the uncertainties for network traffic demand, epistemic uncertainty (or model uncertainty) and aleatoric uncertainty (e.g. data uncertainty or inherent noise or random uncertainty) are utilized to guide TE frameworks and epistemic uncertainty is used for guiding sampling operations in TE frameworks. Specifically, the TE framework asks for prompt MPLS soft-updates based on the epistemic uncertainty. Put another way, the epistemic uncertainty may trigger the TE framework to seek quicker MPLS state-updates.

According to embodiments, a controller node in a general TE framework can vary the sampling rate of the data collected from the network, for example flow statistics in TE applications, for specific times or specific traffic flows based on epistemic uncertainty for network traffic demand. The controller node can also vary a prediction time-window to adjust for epistemic uncertainty, wherein the prediction time-window is the temporal length of the input to the prediction model. Furthermore, the controller node can set network resource reservations for specific times or specific traffic flows, based on a function of the predictive mean of network traffic demand, epistemic uncertainty in the network traffic demand, and aleatoric uncertainty in the network traffic demand. Moreover, the controller node can set forecasting and planning horizons based on one or more of the aleatoric uncertainty and epistemic uncertainty and may thus account for inherent randomness and epistemic uncertainty.

Figure 1B:
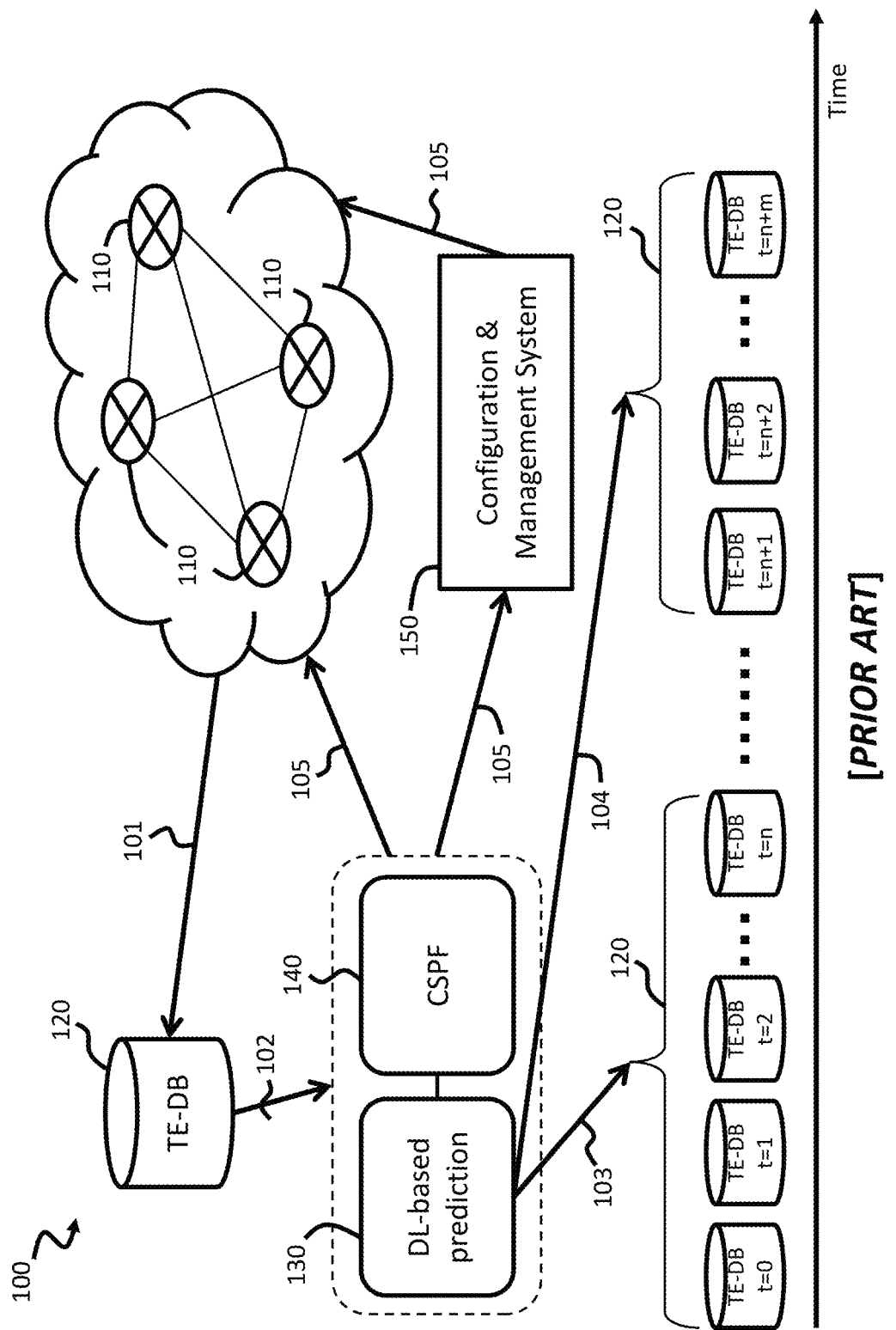
FIG. 1B illustrates the operation of an existing deep reinforcement learning (DRL) based traffic engineering (TE) framework in a communication network.
Figure 1C:
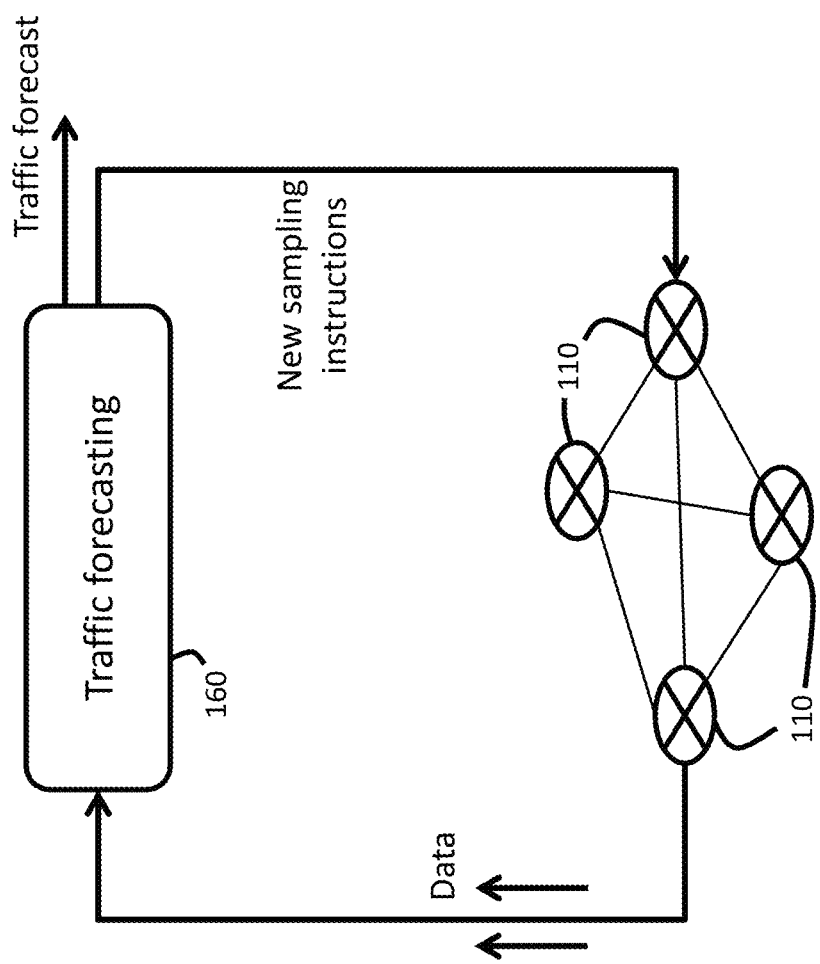

FIG. 1B illustrates the operation of an existing deep reinforcement learning (DRL) based traffic engineering (TE) system or framework 100 in a communication network. The DRL based TE framework 100 and other existing relevant TE systems can predict the TE database (TE-DB) and steer traffic accordingly. In such frameworks, the relevant data is collected at regular intervals based on a predetermined acquisition frequency which may be inefficient.

Referring to FIG. 1B, the DRL based TE framework 100 includes various network components (i.e. switches) 110, TE databases (TE-DBs) 120, a deep learning (DL) based traffic prediction module 130, a constrained shortest path first (CSPF) module 140 and a configuration and management system 150. Each of these components of the DRL based TE framework 100 is communicatively and operatively connected to each other, for example as illustrated in FIG. 1B.

With respect to the operation of the DRL based TE framework 100, the network components (i.e. switches) 110, at step 101, update the TE-DB 120 with state updates, for example network state updates. The TE-DB 120 can be updated in accordance with TE routing protocols such as open shortest path first (OSPF) TE (OSPF-TE), intermediate system to intermediate system TE (ISIS-TE) or other TE routing protocol. The TE-DB 120 contains link/switch attributes, for example delay, bandwidth, and utilization. Each attribute shows some characteristics of the network traffic. For example, the link utilization or link utilization level can show a clear seasonality with some growth for the network link usage.

Through steps 102 to 104, the DL based traffic prediction module 130 can forecast the future network states in the next time steps (for example in the scale of minutes or other time scale) based on the link/switch attributes contained in the TE-DB 120. The DL/DRL agent, at step 102, monitors TE-DB over time, and at step 103, learns the changing patterns in the TE-DB 120 over time. Then, at step 104, the DL/DRL agent continuously predicts the next few states of the TE-DB 120. It should be noted that in some cases, it may be challenging for the DL/DRL agent to accurately predict the next states of the TE-DB 120 as, for example, some network links have less discernable patterns may have a high degree of randomness for their utilization levels.

After the DL based traffic prediction module 130 predicts the next few states, the CSPF module 140 operates to adjust or re-design the network topology based on the prediction. Specifically, the CSPF module 140 determines the new paths or tunnels in the network based on the prediction.

Then, the new paths or tunnels may be configured with aid of the configuration and management system 150. At step 105, based upon the predicted states of the TE-DB 120, the DRL agent either directly or via a configuration and management system (CMS) pre-configures or modifies the newly identified set of required TE tunnels between different network nodes, with aid of the CMS 150.

Attempts have been made to propose TE frameworks that deal with time-varying network traffic or demand. Network traffic or demand is uncertain as the network traffic cannot be accurately predicted due to the unpredictable nature of human behavior as well as unexpected events or network failures. As such, over-provisioning is often used to maintain network performance in light of traffic variations, as over-provisioning would be less problematic than under-provisioning in TE.

In existing TE solutions, network traffic uncertainty in traffic engineering applications is modeled probabilistically or using robust modeling methods. Provided that at least some type of network traffic uncertainty is resulted from the unpredictable nature of the network traffic/demand itself, such network traffic uncertainty would not be mitigated merely by adjusting network traffic prediction model or adding more data samples. This type of uncertainty is known as aleatoric uncertainty. The aleatoric uncertainty is a type of uncertainty associated with aleatory sources and is, by definition, random and thus not reducible.

Another type of uncertainty is the epistemic uncertainty, which is also known as model uncertainty. The epistemic uncertainty or model uncertainty is a type of uncertainty that comes from a lack of knowledge, which can be included in the model, or evaluated based on deficiencies in the prediction model (e.g. traffic forecasting model) itself. Therefore, the epistemic uncertainty may be reduced by collecting information from the network or by adjusting the prediction model, which can be deployed using a neural network. Moreover, provided that deep learning models are black boxes (i.e. not explainable), epistemic uncertainty (or model uncertainty) can be used to understand or define a level of confidence in the model itself.

It has been realised that present focus has been on the aleatoric uncertainty, while not attempting to disentangle or quantify the different sources of uncertainty in the network traffic or demand. As such, it has been determined that there is a need for a TE framework that involves actions or procedures to account for epistemic uncertainty in association with communication network TE.

For an existing TE framework, for example the DRL based TE framework illustrated in FIG. 1B, the TE framework predicts the information of the TE database (TE-DB) and steers the network traffic accordingly. However, in these frameworks, the relevant data is collected at regular intervals based on a predetermined acquisition frequency which can be inefficient. For example, TE-DB updates (soft-updates) are pre-defined for all network flows and time periods as illustrated in FIG. 10. Referring to FIG. 10, the traffic forecasting module 160 regularly sends new sampling instructions to the switches 110 for all traffic flows at a predetermined interval, and receives new sampling data from the switches 110. Then, the traffic forecasting module 160 generates and pushes out a traffic forecast model that is trained with the collected sampling data, for all traffic flows. In other words, no feedback is provided to trigger faster or slower sampling of TE-DB, and therefore the TE forecasting and planning horizon in FIG. 10 is not adaptive, regardless of the network environment and status.

Bayesian/probabilistic traffic forecasting models can be used to extract a predictive mean of the network traffic demand as well as the epistemic and aleatoric uncertainty measures with respect to the network traffic demand. Based on this, the present disclosure provides a method and system (or TE framework) for managing and guiding network traffic in the network based on the uncertainty measures obtained from a Bayesian neural network. The method and system further provides for revisions and adjustments relating to the uncertainty measures. In particular, among two different types of the uncertainty, the present disclosure focuses on the epistemic uncertainty, as the present disclosure provides a method and system for epistemic uncertainty mitigation.

The present disclosure provides an active TE architecture and procedure that rely on the epistemic uncertainty obtained from traffic forecasting models (e.g. Bayesian/probabilistic traffic forecasting models). According to embodiments, the traffic forecasting models can predict the mean of the network traffic demand (i.e. predictive mean) and can extract one or more of the features related to the epistemic uncertainty (i.e. model uncertainty) and the aleatoric uncertainty (i.e. data uncertainty or inherent noise or random uncertainty). It is understood that each uncertainty is related to or associated with the network traffic demand. In the present disclosure, a predictive mean is indicative of a predictive mean of the network traffic demand, and epistemic uncertainty and the aleatoric uncertainty are indicative of epistemic and aleatoric uncertainties in the network traffic demand.

Based on the traffic forecasting models, a TE framework invokes a set of actions on the network. The set of actions includes, based on the network traffic prediction results, invoking a routing or planning module to reserve network resources with over-provisioning based on one or more of the predictive mean of network traffic demand, the epistemic uncertainty (model uncertainty) and the aleatoric uncertainty (inherent noise) in the network traffic demand. The epistemic uncertainty (model uncertainty) may be extracted from a Bayesian (or Variational) neural network or other Bayesian/probabilistic statistical models. The actions further include sending a signal to a controller node to vary the sampling frequency for the collection of state updates (e.g. determining when to sample more data) based on the epistemic uncertainty. The actions further include increasing the time-window used for the network traffic prediction based on the epistemic uncertainty. In various embodiments, a feedback/exploration loop is provided to determine when to sample more data or to determine when to increase the time-window for the prediction. The actions further include setting traffic forecasting and planning horizons based on one or more of the epistemic uncertainty and the aleatoric uncertainty.

The present disclosure separates the epistemic uncertainty (model uncertainty) from the aleatoric uncertainty (data uncertainty or inherent randomness) for TE. According to embodiments, the epistemic uncertainty is used to vary the sampling frequency of network statistics (e.g. flow statistics) in TE applications, for specific times or specific flows. Also, according to embodiments, the time-window used to predict network traffic can be varied (e.g. increased or decreased) to adjust the epistemic uncertainty. It should be noted that the epistemic uncertainty may be essentially reduced to zero with correct (e.g. perfect) data sampling and model parameters. Further, traffic forecasting and planning horizons can be set based on one or more of the aleatoric uncertainty (e.g. inherent randomness) and the epistemic uncertainty.

In some embodiments, the varying of the sampling frequency is at least in part determined based on a threshold associated with the epistemic uncertainty. For example, the sampling frequency can be increased upon determination that the epistemic uncertainty is greater than the threshold. As a further example the sampling frequency can be decreased upon determination that the epistemic uncertainty is lower than the than the threshold. The threshold can be a static threshold or can be a dynamic threshold. For example the selection of the threshold can be defined based on the priority of the network traffic over a particular period of time and as such, as the priority of the network traffic changes the threshold associated with the sampling can be adjusted. In addition, when the selection of the threshold is static, this selection of the threshold can be defined or determined based on a minimum desired level of communication network operation or other parameter as would be readily understood.

Figure 2:
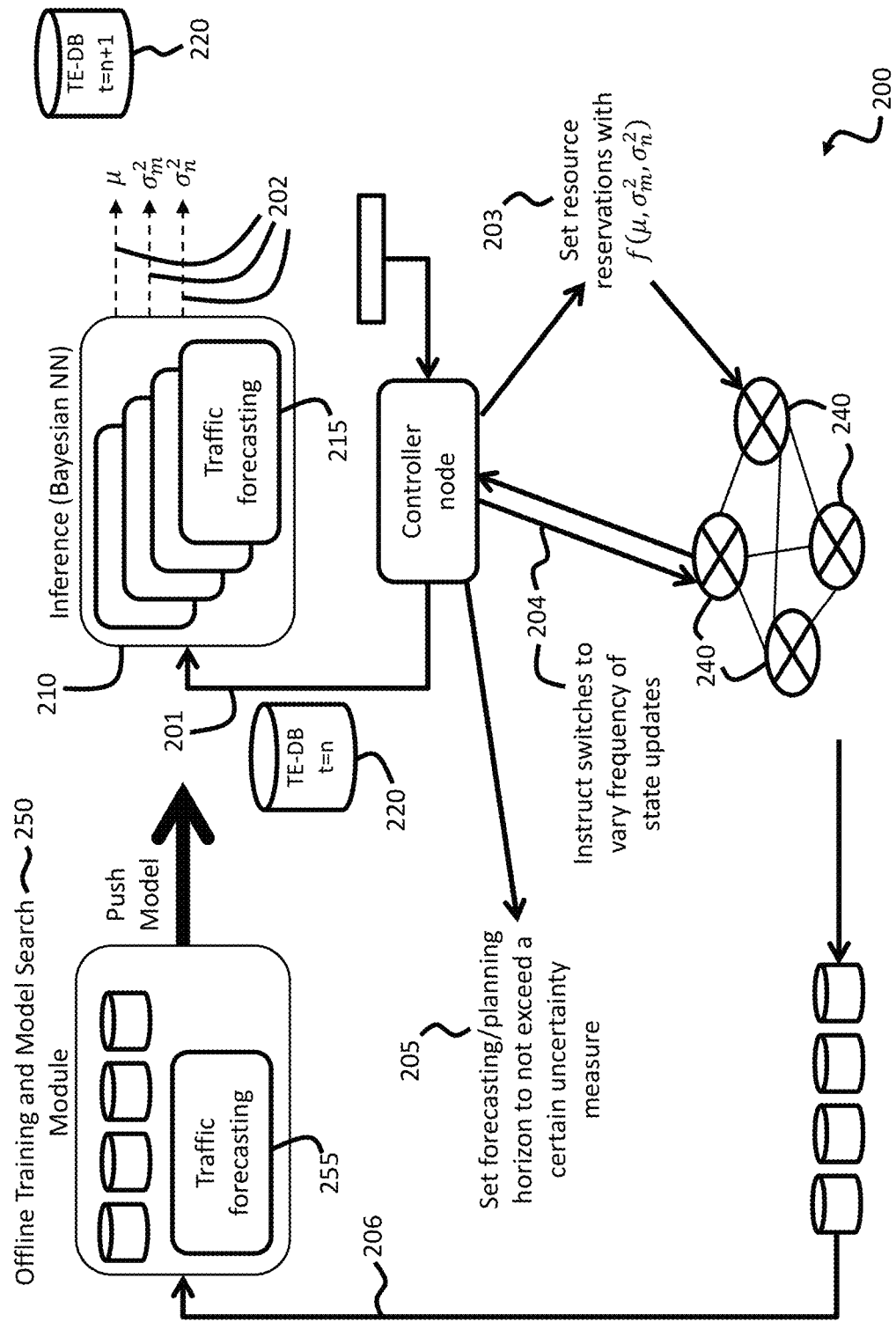
FIG. 2 illustrates a generic TE framework managing the network traffic, in accordance with embodiments of the present disclosure.

FIG. 2 illustrates a generic TE framework 200 managing/guiding the network traffic, in accordance with embodiments of the present disclosure. Referring to FIG. 2, the TE framework 200 includes an inference block 210, TE database (TE-DB) 220, a controller node 230, a variety of network components (for example switches and/or there such network components) 240, and an offline training and model search module 250. Each of these components of the generic TE framework 200 is communicatively and operatively connected to each other, as illustrated in FIG. 2.

According to embodiments, at step 201, the inference block 210 (for example the Bayesian neural network or other suitable model) is continuously or at predetermined intervals or intermittently provided with one or more network statistics from the changing database 220. These network statistics can be provided as discrete time epochs, which can be defined as a period of time in past history of network operation that may be identified by one or more a notable events or one or more particular characteristics. The changing database 220 contains various network statistics collected from the network. The network statistics contained in the database 220 may include one or more of per-flow statistics, per-link statistics and per-node statistics and other statistics as would be readily understood.

In various embodiments, the inference block 210 (e.g. Bayesian neural network or other suitable model as would be readily understood) resembles a Bayesian or probabilistic traffic forecasting model 215 that is capable of extracting the predictive mean ($\mu$), the model uncertainty ($\sigma_m^2$), and the inherent noise or aleatoric uncertainty ($\sigma_n^2$) associated with the forecasting model. At step 202, the inference block 210 (e.g. Bayesian neural network) extracts the predictive mean ($\mu$), the model uncertainty ($\sigma_m^2$), and the inherent noise or aleatoric uncertainty ($\sigma_n^2$). In some embodiments, the extracted predictive mean ($\mu$), the model uncertainty ($\sigma_m^2$), and the inherent noise or aleatoric uncertainty ($\sigma_n^2$) may be stored in the changing database 220.

The extracted values, for example the predictive mean ($\mu$), the model uncertainty ($\sigma_m^2$), and the inherent noise or aleatoric uncertainty ($\sigma_n^2$), are transmitted to the controller node 230 in the network. The controller node 230 is configured to re-configure or re-design the network topology, and set or assign the network resource reservations for the existing network services and requests. The controller node 230, at step 203, sets resource reservations based on a function of the extracted values (i.e. the predictive mean ($\mu$), the epistemic uncertainty (model uncertainty) ($\sigma_m^2$), and the inherent noise or aleatoric uncertainty ($\sigma_n^2$)). For example, the controller node 230 sets network resource reservation for a link or a path according to a function defined in Equation 1:

$$f(\mu, \sigma_m^2, \sigma_n^2) = \mu + \sigma_m^2 + \beta \sigma_n^2 \qquad (1)$$

where: $\alpha$, $\beta$ are scalar coefficients.

The controller node 230, at step 204, can vary the frequency of state updates for specific time-periods or specific flows based on the epistemic uncertainty (model uncertainty), $\sigma_m^2$. For example, the controller node 230 can instruct the switches 240 in the data plane to vary the frequency of state updates for specific time-periods or specific flows based on the epistemic uncertainty (model uncertainty), $\sigma_m^2$. In some embodiments, when the controller node 230 determines that the uncertainty of the traffic forecasting model for a certain time period or traffic flow is outside of a threshold (e.g. predetermined value), the controller node 230 adjusts the sampling frequency of state updates for that time period or traffic flow based on the epistemic uncertainty.

At step 205, the controller node 230 can set a planning horizon (i.e. the length of time into the future for which the plan is made) and equivalently the forecasting horizon (i.e. the length of time into the future for which forecasts are to be prepared) of the traffic forecasting module to mitigate instances where an overall weighted uncertainty measure exceeds a threshold. The overall weighted uncertainty measure can be defined as provided in Equation 2.

$$\gamma_1 \sigma_m^2 + \gamma_2 \sigma_n^2 \qquad (2)$$

where: $\gamma_1$, $\gamma_2$ are scalar coefficients

In some embodiments, the scalar coefficients for the overall weighted uncertainty ($\gamma_1$, $\gamma_2$) may be determined based on a network tolerance level (for example based on one or more of a network fault tolerance and a network delay tolerance). The controller node 230 may define the forecasting and planning horizon based on one or more of the epistemic uncertainty and the aleatoric uncertainty. It should be noted that by having more data samples available (either through more frequent data samplings or using data samples from further in past, resulting in longer time periods), the model uncertainty or epistemic uncertainty may be reduced. It should be also noted that the further into the future that the traffic forecasting model is projecting, it is likely that the epistemic uncertainty will increase.

At step 206, the one or more network statistics contained in the TE-DB 220 are collected and continuously or periodically or intermittently provided to the offline training and model search module 250. According to embodiments, the traffic forecasting model 255 may be additionally trained or updated using the offline training and model search module 250. Once the training of the traffic forecasting model is completed, the trained or updated traffic forecasting model 255 can be pushed to the inference block 210 (for example a Bayesian neural network) for use thereby and enabling an enhanced network operation, for example due to the use of an enhanced or updated traffic forecasting model.

Figure 3:
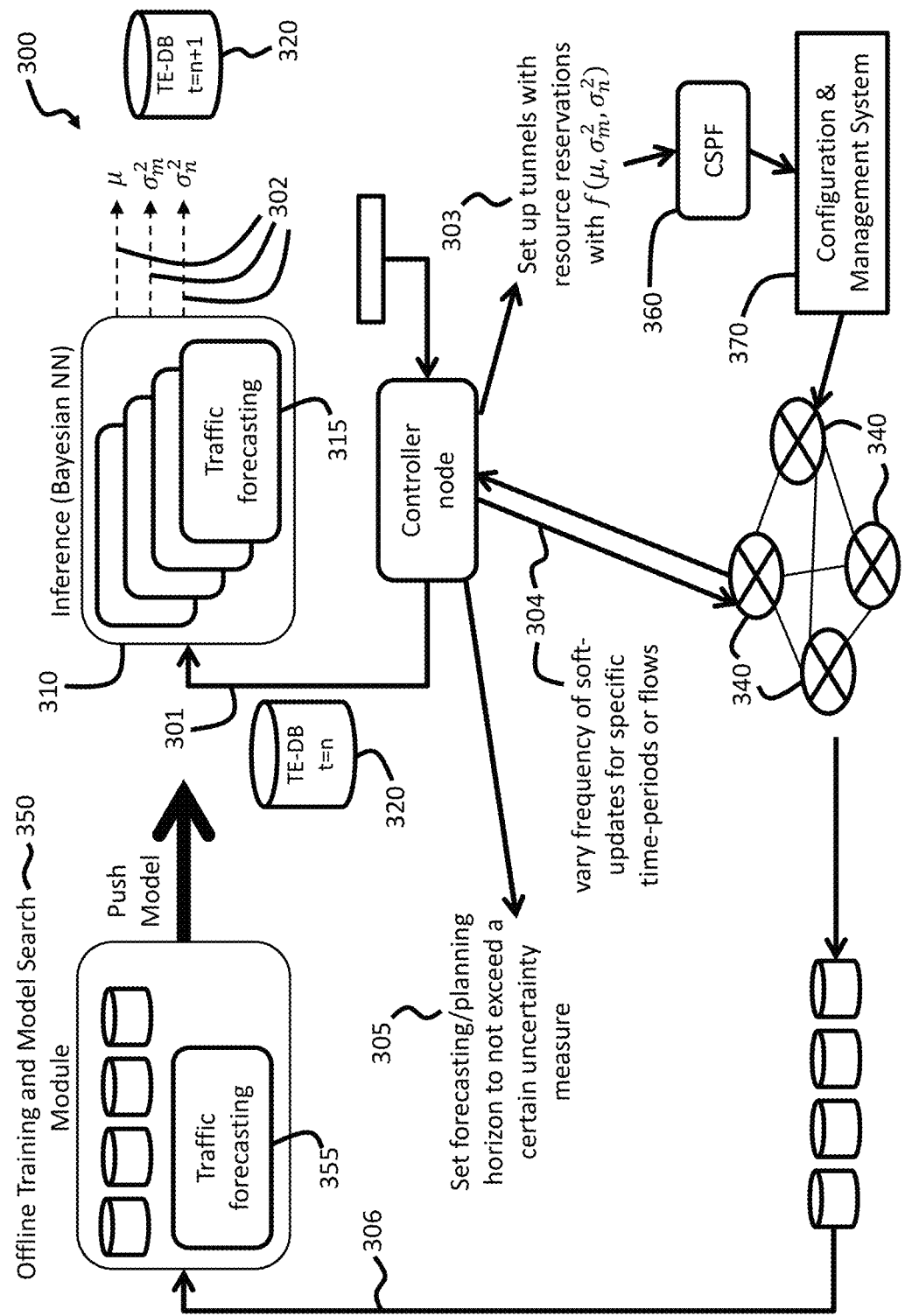
FIG. 3 illustrates a TE framework compatible with existing multiprotocol label switching (MPLS) protocol, in accordance with embodiments of the present disclosure.

FIG. 3 illustrates a TE framework 300 compatible with existing multiprotocol label switching (MPLS) protocol, in accordance with embodiments of the present disclosure. The MPLS-TE framework 300 is generally similar to the generic TE framework 200 illustrated in FIG. 2. Compared to the generic TE framework 200, there are additional network components added in the TE framework 300 to work with the multiprotocol label switching (MPLS) protocol. For example, TE framework 300 includes a constrained shortest path first (CSPF) module 360 and a configuration and management system 370 in order for the TE framework 300 to be suitable for application with MPLS protocol(s). In MPLS-TE, the switches in the data plane send regular information and/or network statistics to the controller node, and such updates are referred to as soft-updates.

Referring to FIG. 3, the TE framework 300 includes the inference block 310, TE databases (TE-DBs) 320, the controller node 330, various network components (i.e. switches) 340, the offline training and model search module 350, constrained shortest path first (CSPF) module 360 and the configuration and management system 370. Each of these components of the MPLS-TE framework 300 is communicatively and operatively connected to each other, as illustrated in FIG. 3.

According to embodiments, at step 301, the inference block 310 (for example a Bayesian neural network or other suitable neural network configuration) is continuously or at predetermined intervals or intermittently provided with one or more network statistics from the changing database 320. These network statistics can be provided as discrete time epochs, which can be defined as a period of time in past history of network operation that may be identified by one or more a notable events or one or more particular characteristics. The changing database 320 contains various network statistics collected from the network. The network statistics contained in the database 320 may include one or more of per-flow statistics, per-link statistics and per-node statistics and other statistics as would be readily understood.

In various embodiments, the inference block 310 e.g. Bayesian neural network or other suitable neural network as would be readily understood) resembles a Bayesian or probabilistic traffic forecasting model 315 that is capable of extracting the predictive mean ($\mu$), the model or epistemic uncertainty ($\sigma_m^2$), and the inherent noise or aleatoric uncertainty ($\sigma_n^2$) associated with the forecasting model. At step 302, the inference block 310 (e.g. Bayesian neural network) extracts the predictive mean ($\mu$), the model or epistemic uncertainty ($\sigma_m^2$), and the inherent noise or aleatoric uncertainty ($\sigma_n^2$) associated with the forecasting model. In some embodiments, the extracted predictive mean ($\mu$), the model or epistemic uncertainty ($\sigma_m^2$), and the inherent noise or aleatoric uncertainty ($\sigma_n^2$) may be stored in the changing database 320.

The extracted values, for example the predictive mean ($\mu$), the model uncertainty ($\sigma_m^2$), and the inherent noise or aleatoric uncertainty ($\sigma_n^2$), are transmitted to the controller node 330 in the network. The controller node 330 is configured to re-configure or re-design the network topology. According to embodiments, the controller node 330 utilizes the CSPF module 360 and the configuration and management system 370 to reserve tunnels (e.g. paths) with network resource reservations based on a function of the predictive mean, epistemic uncertainty (e.g. model uncertainty), and aleatoric uncertainty (e.g. inherent noise). The controller node 330, at step 303, sets up tunnels (e.g. paths) with network resource reservations based on a function of the the predictive mean ($\mu$), the epistemic uncertainty (e.g. model uncertainty) ($\sigma_m^2$), and the inherent noise or aleatoric uncertainty ($\sigma_n^2$). For example, the controller node 330 sets up tunnels (paths) with network resource reservation according to a function as defined in Equation 3.

$$f(\mu,\sigma_m^2,\sigma_n^2)=\mu+\alpha\sigma_m^2+\beta\sigma_n^2 \tag{3}$$

where: $\alpha$, $\beta$ are scalar coefficients.

The controller node 330, at step 304, receives the soft-updates from the switches 340 in the data plane, and changes the frequency of the soft-updates (received from switches 340) for specific times or specific flows based on the epistemic uncertainty (e.g. model uncertainty), $\sigma_m^2$. In some embodiments, when the controller node 230 determines that the uncertainty of the traffic forecasting model for a certain time period or traffic flow is outside of a threshold (e.g. predetermined value), the controller node 330 adjusts the sampling frequency of state updates for that time period or traffic flow based on the epistemic uncertainty.

At step 305, the controller node 330 can set a planning horizon and equivalently the forecasting horizon (i.e. the length of time into the future for which forecasts are to be prepared) of the traffic forecasting module to mitigate instances where an overall weighted uncertainty measure exceeds a threshold. The overall weighted uncertainty measure can be defined as provided in Equation 4.

$$\gamma_1\sigma_m^2+\gamma_2\sigma_n^2 \tag{4}$$

where: $\gamma_1$, $\gamma_2$ are scalar coefficients

In some embodiments, the scalar coefficients for the overall weighted uncertainty ($\gamma_1$, $\gamma_2$) may be determined based on network tolerance level (for example based on one or more of network fault tolerance and network delay tolerance). The controller node 330 may define the forecasting and planning horizon based on one or more of the epistemic uncertainty and the aleatoric uncertainty. It should be noted that by having more data samples available (either through more frequent data samplings or using data samples from further in past, resulting in longer time periods), the model uncertainty or epistemic uncertainty may be reduced. It should be also noted that the further into the future that the traffic forecasting model is projecting, it is likely that the epistemic uncertainty will increase.

At step 306, the one or more network statistics contained in the TE-DB 320 are collected and continuously or periodically or intermittently provided to the offline training and model search module 350. According to embodiments, the traffic forecasting model 355 may be additionally trained or updated using the offline training and model search module 350. Once the training of the traffic forecasting model is completed, the trained or updated traffic forecasting model 355 can be pushed to the inference block 310 (for example a Bayesian neural network) for use thereby and enabling an enhanced network operation, for example due to the use of an enhanced or updated traffic forecasting model.

It should be noted that unlike the MPLS-TE framework 300 according to embodiments, existing MPLS-TE protocols and implementations do not take account into uncertainty, and therefore also do not provide any method for varying the frequency of state updates or soft-updates based on the epistemic uncertainty.

Figure 4:
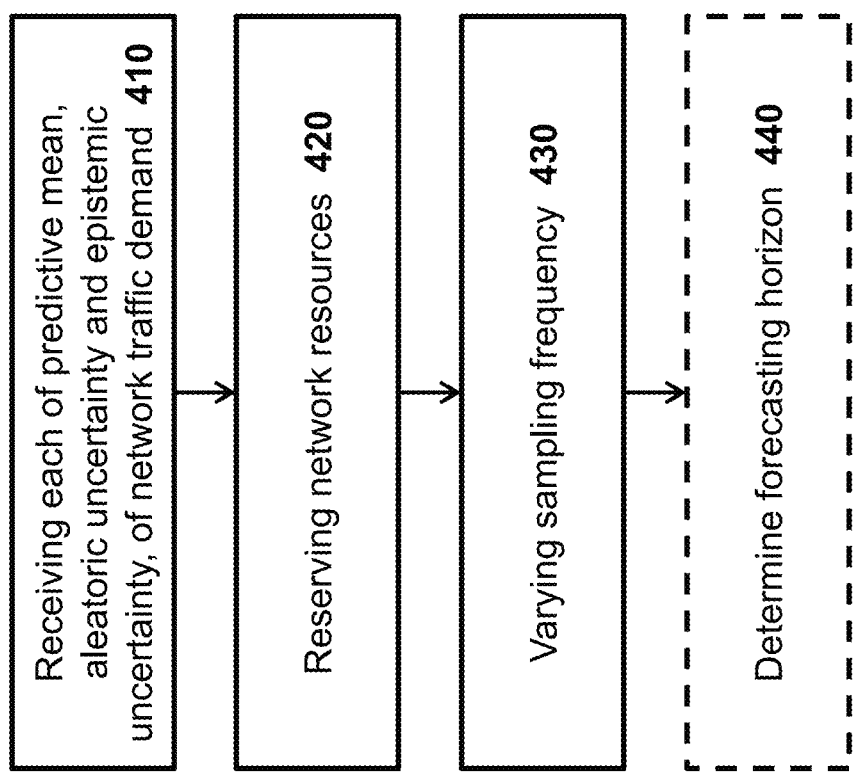
FIG. 4 illustrates a method for managing network traffic in a network, in accordance with embodiments of the present disclosure.

FIG. 4 illustrates a method 400 for managing network traffic in a communication network in accordance with embodiments of the present disclosure. The method includes receiving 410, by a controller node from a traffic forecasting model, a predictive mean of network traffic demand, an aleatoric uncertainty ($\sigma_n^2$) associated with the network traffic demand and an epistemic uncertainty ($\sigma_m^2$) associated with the network traffic demand. The method further includes reserving 420, by the controller node, network resources based on a function of the predictive mean (μ), the aleatoric uncertainty ($\sigma_n^2$) and the epistemic uncertainty ($\sigma_m^2$). The method additionally includes varying 430, by the controller node, a sampling frequency of network statistics for a specific time-period or a network flow based at least in part based on the epistemic uncertainty ($\sigma_m^2$).

In some embodiments, the method further includes determining 440, by the controller node, a forecasting and planning horizon based on one or more of the epistemic uncertainty ($\sigma_m^2$) and the aleatoric uncertainty ($\sigma_n^2$) such that an overall weighted uncertainty of the traffic forecasting model is below a threshold, the forecasting and planning horizon indicative of a time period for which the traffic forecasting model is applicable.

In some embodiments, the varying of the sampling frequency is at least in part determined based on a threshold associated with the epistemic uncertainty. For example, the sampling frequency can be increased upon determination that the epistemic uncertainty is greater than the threshold. As a further example the sampling frequency can be decreased upon determination that the epistemic uncertainty is lower than the than the threshold. The threshold can be a static threshold or can be a dynamic threshold. For example the selection of the threshold can be defined based on the priority of the network traffic over a particular period of time and as such, as the priority of the network traffic changes the threshold associated with the sampling can be adjusted. In addition, when the selection of the threshold is static, this selection of the threshold can be defined or determined based on a minimum communication network operational limitation or other parameter as would be readily understood.

In some embodiments, the controller node utilizes a constrained shortest path first (CSPF) module and a configuration and management system (CMS), wherein setting resource reservations includes utilizing the CSPF module and the CMS to configure tunnels with resource reservations based on the function of the predictive mean (μ), the aleatoric uncertainty ($\sigma_n^2$) and the epistemic uncertainty ($\sigma_m^2$).

Various embodiments of the present disclosure, including those illustrated above, propose to method and system or framework for reserving network resources while taking into account uncertainty, which may include one or more of aleatoric uncertainty and epistemic uncertainty. This method and framework may be further generalized to many applications in the fields of network communication and sensing network or other relevant fields of technology. For example, a communication tower, such as evolved node B (eNB) or gNB, can be configured to vary sampling or sensing of data received from a user equipment (UE) based on uncertainty measures.

Figure 5:
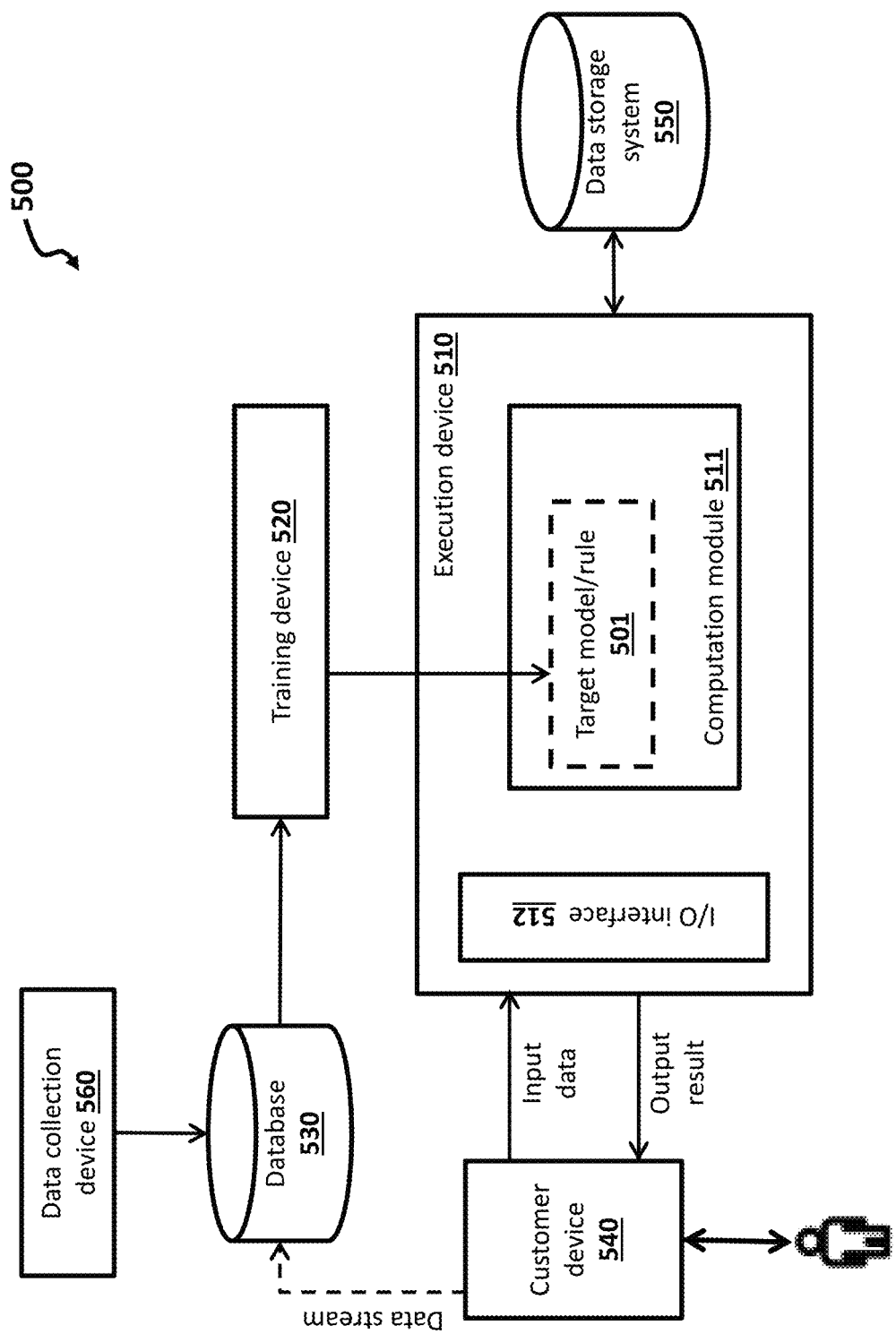
FIG. 5 is a schematic diagram of a system architecture according to an embodiment of the present disclosure.

FIG. 5 is a schematic structural diagram of a system architecture 500 according to an embodiment of the present disclosure. As illustrated in FIG. 5, a data collection device 560 is configured to collect network traffic data (e.g. network statistics, per-flow statistics, per-link statistics, per-node statistics) and store the data into a database 530. A training device 520 generates a target model/rule 501 based on the network traffic data maintained in the database 530 (e.g. TE-DB 220, TE-DB 320).

The target model/rule 501 may refer to the trained traffic forecasting model (e.g. traffic forecasting models 255, 355) having applied the training embodiments described herein, for example, embodiments described in reference to FIGS. 2 and 3. Accordingly, the training device 520 may refer to the offline training and model search modules 250, 350 and perform the model training, for example, as described in the embodiments described in FIGS. 2 and 3. The following describes in more detail how the training device 520 (e.g. the offline training and model search modules 250, 350) obtains the target model/rule 501 (e.g. traffic forecasting models 255, 355) based on the collected network traffic data (e.g. network statistics, per-flow statistics, per-link statistics, per-node statistics) contained in the database 530 (e.g. TE-DB 220, TE-DB 320). It should be noted that the one or more methods described herein may be processed by a CPU, or may be jointly processed by a central processing unit (CPU) and a graphics processing unit (GPU), or may not be processed by a GPU, but processed by another processor that is applicable to neural network computation. This is not limited in the instant application.

Work at each layer of a deep neural network may be described by using a mathematical expression $\vec{y}=a(W\Box\vec{x}+b)$: From a physical perspective, the work at each layer of the deep neural network can be understood as performing five operations on input space (a set of input vectors), to complete a conversion from the input space into output space (in other words, from row space to column space of a matrix). The five operations include: 1. Dimensionality increase/reduction; 2. zooming in/out; 3. rotation; 4. panning; and 5. "bending". The operations 1, 2, and 3 are performed by $W\Box\vec{x}$, the operation 4 is performed by +b, and the operation 5 is implemented by a( ). Herein, a reason why the word "space" is used for description is that objects to be classified are not single matters, but are a type of matters. The space indicates a set of all individuals in this type of matters. W denotes a weight vector. Each value in the vector indicates a weight value of one neural cell at the layer of neural network. The vector W decides the foregoing spatial conversion from the input space to the output space. In other words, the weight W of each layer controls how to convert space. A purpose of training the deep neural network is to finally obtain a weight matrix (a weight matrix consisting of vectors W of a plurality of layers) of all layers of the trained neural network. Therefore, in essence, the training process of the neural network is learning a manner of controlling spatial conversion, and more specifically, learning a weight matrix.

To enable the deep neural network to output a predicted value that is as close to a truly desired value as possible, a predicted value of a current network and a truly desired target value may be compared, and a weight vector of each layer of the neural network is updated based on a difference between the predicted value and the truly desired target value (Certainly, there is usually an initialization process before a first update. To be specific, a parameter is preconfigured for each layer of the deep neural network). For example, if the predicted value of a network is excessively high, continuously adjust a weight vector to lower the predicted value, until the neural network can predict the truly desired target value. Therefore, "how to compare a difference between a predicted value and a target value" needs to be predefined. To be specific, a loss function (loss function) or an objective function (objective function) needs to be predefined. The loss function and the objective function are important equations used to measure the difference between a predicted value and a target value. For example, the loss function is used as an example. A higher output value (loss) of the loss function indicates a greater difference. In this case, training the deep neural network is a process of minimizing the loss.

The target module/rule 501 obtained by the training device 520 may be applied to different systems or devices. In FIG. 5, an execution device 510 is provided with an I/O interface 512 to perform data interaction with an external device. A "user" may input data to the I/O interface 512 by using a customer device 540.

The execution device 510 may refer to the inference block 210 or 310 or the controller node 230 or 330, having applied the embodiments described herein, for example, the embodiments described in FIGS. 2 and 3. The execution device 510 may invoke data, code, and the like from a data storage system 550 (e.g. TE-DB 220, TE-DB 320), and may store the data, an instruction, and the like into the data storage system 550. For example, the execution device 510 may invoke the collected network statistics, at discrete time epochs, from the data storage system 550 (e.g. TE-DB 220, TE-DB 320) and, in some embodiments, may store a predictive mean ($\mu$), a model uncertainty ($\sigma_m^2$), and an inherent noise or aleatoric uncertainty ($\sigma_n^2$) in the the data storage system 550.

The I/O interface 512 may return a processing result to the customer device 540 and provides the processing result to the user. More deeply, the training device 520 may generate a corresponding target model/rule 501 for different targets based on different network traffic data (e.g. network statistics, per-flow statistics, per-link statistics, per-node statistics). The corresponding target model/rule 501 may be used to implement the foregoing target to provide a desired result for the user.

In a case shown in FIG. 5, the user may manually specify data to be input to the execution device 510, for example, an operation in a screen provided by the I/O interface 512. In another case, the customer device 540 may automatically input data to the I/O interface 512 and obtain a result. If the customer device 540 automatically inputs data, authorization of the user needs to be obtained. The user can specify a corresponding permission in the customer device 540. The user may view, in the customer device 540, the result output by the execution device 510. A specific presentation form may be display content, a voice, an action, and the like. In addition, the customer device 540 may be used as a data collector to store collected network traffic data (e.g. network statistics, per-flow statistics, per-link statistics, per-node statistics) into the database 530.

It should be noted that FIG. 5 is merely a schematic diagram of a system architecture according to an embodiment of the present disclosure. Position relationships between the device, the component, the module, and the like that are shown in FIG. 5 do not constitute any limitation. For example, in FIG. 5, the data storage system 550 is an external memory relative to the execution device 510. In another case, the data storage system 550 may be located in the execution device 510.

According to embodiments, a configuration of the neural network applicable to the instant application is a Bayesian neural network (BNN). A BNN refers to extending standard neural networks with posterior inference in order to control over-fitting. The Bayesian approach uses a statistical methodology so that everything has a probability distribution attached to it, including model parameters (for example the weights and biases in a neural network). In the Bayesian neural network, you can have similar entities also known as random variables that will give you a different value each time the BNN is applied. In Bayesian terms, the historical data represents prior knowledge of the overall behavior with each variable, such that each variable has statistical properties that can vary with time. Bayesian methods can allow the consideration of an entire distribution of answers, which can address issues relating to regularization, for example overfitting, and model selection or comparison without a need for a separate cross validation data set.

Figure 6:
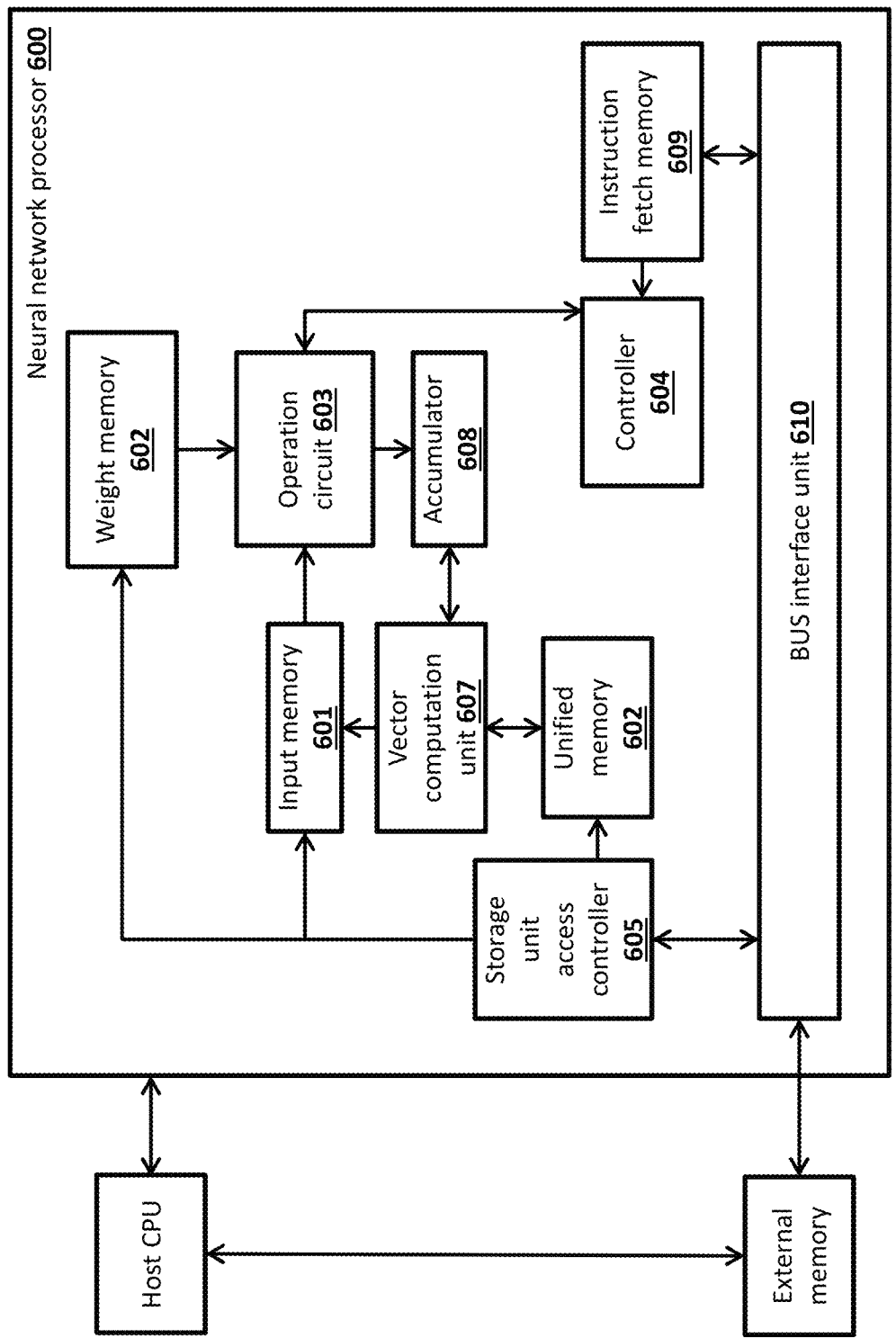
FIG. 6 is a hardware diagram of a chip according to an embodiment of the present disclosure.

FIG. 6 is a structural hardware diagram of a chip according to an embodiment of the present disclosure. The chip includes a neural network processor 600. The chip may be provided in the execution device 510 shown in FIG. 5, to perform computation for the computation module 511. Alternatively, the chip may be provided in the training device 520 shown in FIG. 5, to perform training and output the target model/rule 501. All the algorithms of layers (not shown in FIG. 2 or 3) of the Bayesian neural network in FIGS. 2 and. 3 may be implemented in the chip shown in FIG. 6.

The neural network processor 600 may be any processor that is applicable to massive exclusive OR operations, for example, a neural processing unit (NPU), a tensor processing unit (TPU), a graphics processing unit (GPU), or the like. The NPU is used as an example. The NPU may be mounted, as a coprocessor, to a host central processing unit (CPU), and the host CPU may allocate a task to the NPU. A core part of the NPU is an operation circuit 603. A controller 604 controls the operation circuit 603 to extract matrix data from memories (601 and 602) and perform multiplication and addition operations.

In some implementations, the operation circuit 603 internally includes a plurality of processing units (e.g., Process Engine, PE). In some implementations, the operation circuit 603 is a bi-dimensional systolic array. In addition, the operation circuit 603 may be a unidimensional systolic array or another electronic circuit that can implement a mathematical operation such as multiplication and addition. In some implementations, the operation circuit 603 is a general matrix processor.

For example, it is assumed that there are an input matrix A, a weight matrix B, and an output matrix C. The operation circuit 603 may obtain, from a weight memory 602, weight data of the matrix B, and cache the data in each PE in the operation circuit 603. The operation circuit 603 may obtain input data of the matrix A from an input memory 601, and perform a matrix operation based on the input data of the matrix A and the weight data of the matrix B. An obtained partial or final matrix result may be stored in an accumulator (accumulator) 608.

A unified memory 606 may be configured to store input data and output data. Weight data may be directly moved to the weight memory 602 by using a storage unit access controller (e.g., direct memory access controller, DMAC)

605. The input data may also be moved to the unified memory 606 by using the DMAC.

A bus interface unit (BIU) 610 may be used for interaction between the storage unit access controller (e.g., DMAC) 605 and an instruction fetch memory (Instruction Fetch Buffer) 609. The bus interface unit 610 may further be configured to enable the instruction fetch memory 609 to obtain an instruction from an external memory. The BIU 610 may further be configured to enable the storage unit access controller 605 to obtain, from the external memory, source data of the input matrix A or the weight matrix B.

The storage unit access controller (e.g., DMAC) 605 is mainly configured to move input data from an external memory DDR to the unified memory 606, or move the weight data to the weight memory 602, or move the input data to the input memory 601.

A vector computation unit 607 may include a plurality of operation processing units. If needed, the vector computation unit 607 may perform further processing, for example, vector multiplication, vector addition, an exponent operation, a logarithm operation, or magnitude comparison, on an output from the operation circuit 603. The vector computation unit 607 may be mainly used for computation at a non-convolutional layer or fully-connected layers (FC, fully connected layers) of a neural network, for example, pooling (pooling), batch normalization (batch normalization), or local response normalization (local response normalization).

In some implementations, the vector computation unit 607 may store, to the unified memory 606, a vector output through processing (or a processed vector). For example, the vector computation unit 607 may apply a nonlinear function to an output of the operation circuit 603, for example, a vector of an accumulated value, to generate an activation value. In some implementations, the vector computation unit 607 may generate a normalized value, a combined value, or both a normalized value and a combined value.

In some implementations, the vector output through processing (the vector processed by the vector computation unit 607) may be used as activation input to the operation circuit 603, for example, to be used in some layer(s) of the Bayesian neural network.

The instruction fetch memory (instruction fetch buffer) 609 connected to the controller 604 may be configured to store an instruction used by the controller 604. The unified memory 606, the input memory 601, the weight memory 602, and the instruction fetch memory 609 may all be on-chip memories. The external memory may be independent from the hardware architecture of the NPU.

Operations of the layers of the Bayesian neural network may be performed by the operation circuit 603 or the vector computation unit 607.

Figure 7:
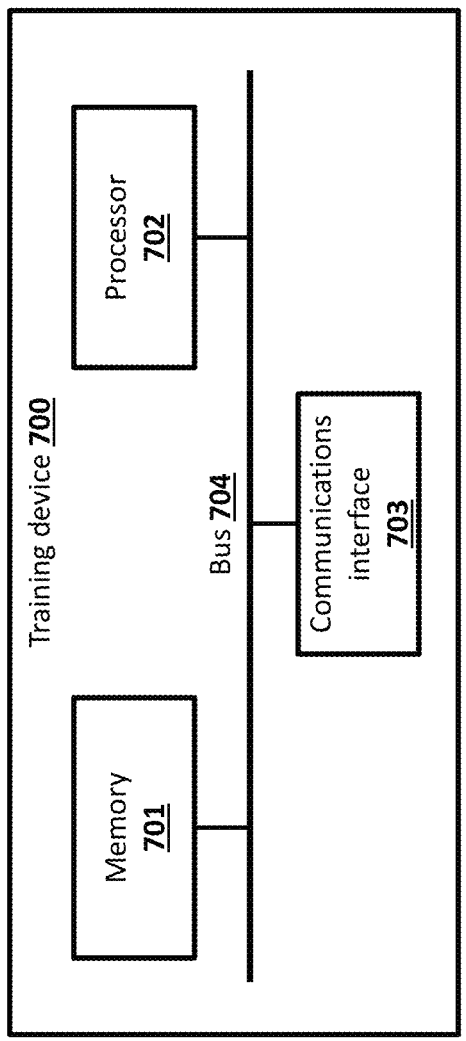
FIG. 7 illustrates a schematic diagram of a hardware structure of a training apparatus according to an embodiment of the present disclosure.

FIG. 7 illustrates a schematic diagram of a hardware structure of a training apparatus according to an embodiment of the present disclosure. A training apparatus 700 (the apparatus 700 may be a computer device and may refer to the training device 520 or a device containing the offline training and model search module 250 or 350) may include a memory 701, a processor 702, a communications interface 703, and a bus 704. A communication connection is implemented between the memory 701, the processor 702, and the communications interface 703 by using the bus 704.

The memory 701 may be a read-only memory (ROM), a static storage device, a dynamic storage device, or a random-access memory (RAM). The memory 701 may store a program. The processor 702 and the communications interface 703 may be configured to perform, when the program stored in the memory 701 is executed by the processor 702, steps of one or more embodiments described herein, for example, embodiments described in reference to FIG. 2 and FIG. 3.

The processor 702 may be a general central processing unit (CPU), a microprocessor, an application-specific integrated circuit (ASIC), a graphics processing unit (GPU), or one or more integrated circuits. The processor 702 may be configured to execute a related program to implement a function that needs to be performed by a unit in the training apparatus according to one or more embodiments described herein, for example, embodiments described in reference to FIG. 2 and FIG. 3.

In addition, the processor 702 may be an integrated circuit chip with a signal processing capability. In an implementation process, steps of one or more training methods described herein may be performed by an integrated logical circuit in a form of hardware or by an instruction in a form of software in the processor 702. In addition, the foregoing processor 702 may be a general-purpose processor, a digital signal processor (DSP), an application-specific integrated circuit (ASIC), a field programmable gate array (FPGA) or other programmable logic device, a discrete gate or a transistor logic device, or a discrete hardware assembly. The processor 702 may implement or execute the methods, steps, and logical block diagrams that are disclosed in the embodiments of this disclosure. The general purpose processor may be a microprocessor, or the processor may be any conventional processor or the like. The steps of the method disclosed with reference to the embodiments of this disclosure may be directly performed by a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium may be located in the memory 701. The processor 702 may read information from the memory 701, and completes, by using hardware in the processor 702, the functions that need to be performed by the units included in the training device according to one or more embodiment described herein, for example, embodiments described in reference to FIG. 2 and FIG. 3.

The communications interface 703 may implement communication between the apparatus 700 and another device or communications network by using a transceiver apparatus, for example, including but not limited to a transceiver. For example, training data (for example, network traffic data such as network statistics, per-flow statistics, per-link statistics, per-node statistics) may be obtained by using the communications interface 703.

The bus 704 may include a path that transfers information between all the components (for example, the memory 701, the processor 702, and the communications interface 703) of the apparatus 700.

Figure 8:
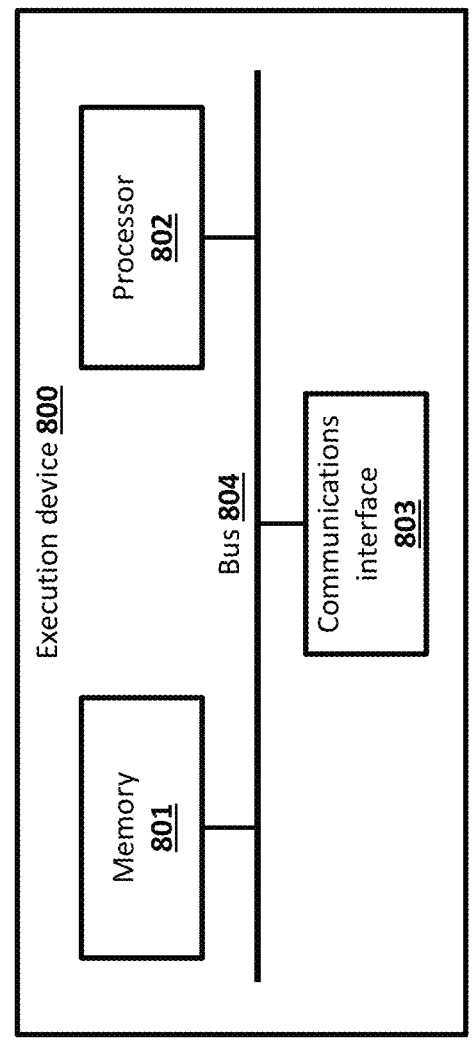
FIG. 8 illustrates a schematic diagram of a hardware structure of an execution apparatus according to an embodiment of the present disclosure.

FIG. 8 illustrates a schematic diagram of a hardware structure of an execution apparatus according to an embodiment of the present disclosure. The execution apparatus may refer to the execution device 510 of FIG. 5. Execution apparatus 800 (which may be a computing device) includes a memory 801, a processor 802, a communications interface 803, and a bus 804. A communication connection is implemented between the memory 801, the processor 802, and the communications interface 803 by using the bus 804.

The memory 801 may be a read-only memory (ROM), a static storage device, a dynamic storage device, or a random-access memory (RAM). The memory 801 may store a program. The processor 802 and the communications interface 803 are configured to perform, when the program stored in the memory 801 is executed by the processor 802, step(s) of one or more embodiments described herein, for example, embodiments described in reference to FIG. 2 and FIG. 3.

The processor 802 may be a general central processing unit (CPU), a microprocessor, an application-specific integrated circuit (ASIC), a graphics processing unit (GPU), or one or more integrated circuits. The processor 802 may be configured to execute a related program to implement a function that needs to be performed by a unit in the execution apparatus according to one or more embodiments described herein, for example, embodiments described in reference to FIG. 2 and FIG. 3.

In addition, the processor 802 may be an integrated circuit chip with a signal processing capability. In an implementation process, steps of one or more execution methods described herein (e.g. varying frequency of state updates) may be performed by an integrated logical circuit in a form of hardware or by an instruction in a form of software in the processor 802. In addition, the processor 802 may be a general-purpose processor, a digital signal processor (DSP), an application-specific integrated circuit (ASIC), a field programmable gate array (FPGA) or other programmable logic device, a discrete gate or a transistor logic device, or a discrete hardware assembly. The general-purpose processor may be a microprocessor, or the processor may be any conventional processor or the like. The steps of the method disclosed with reference to the embodiments of this application may be directly performed by a hardware decoding processor, or may be performed by using a combination of hardware in the decoding processor and a software module. The software module may be located in a mature storage medium in the art, such as a random-access memory, a flash memory, a read-only memory, a programmable read-only memory, an electrically erasable programmable memory, or a register. The storage medium may be located in the memory 801. The processor 802 may read information from the memory 801, and completes, by using hardware in the processor 802, to perform the functions that need to be performed by the units included in the execution device according to one or more embodiment described herein, for example, embodiments described in reference to FIG. 2 and FIG. 3.

The communications interface 803 may implement communication between the apparatus 800 and another device or communications network by using a transceiver apparatus, for example, including but not limited to a transceiver. For example, training data for one or more downstream tasks may be obtained by using the communications interface 803.

The bus 804 may include a path that transfers information between all the components (for example, the memory 801, the processor 802, and the communications interface 803) of the apparatus 800.

It should be noted that, although only the memory, the processor, and the communications interface are shown in the apparatuses 700 (in FIG. 7) and 800 (in FIG. 8), a person skilled in the art should understand that the apparatuses 1300 and 800 may further include other components that are necessary for implementing normal running. In addition, based on specific needs, a person skilled in the art should understand that the apparatuses 700 and 800 may further include hardware components that implement other additional functions. In addition, a person skilled in the art should understand that the apparatuses 700 and 800 may include only a component required for implementing the embodiments of the present disclosure, without a need to include all the components shown in FIG. 7 or FIG. 8.

It may be understood that the apparatus 700 is equivalent to the training device 520 in FIG. 5, and the apparatus 800 is equivalent to the execution device 510 in FIG. 5. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 9:
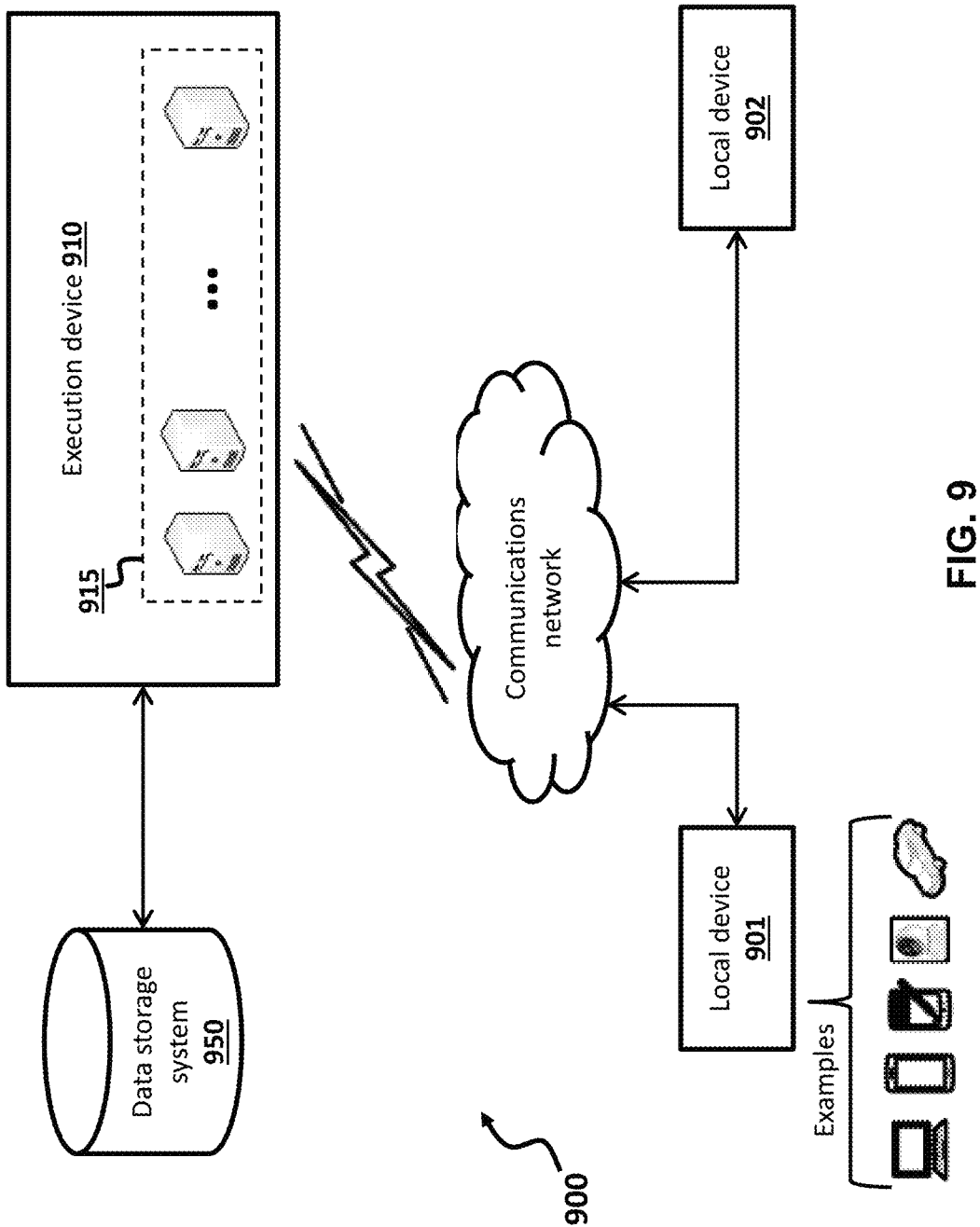
FIG. 9 illustrates a system architecture according to an embodiment of the present disclosure.

FIG. 9 illustrates a system architecture 900 according to an embodiment of the present disclosure. The execution device 910 may be implemented by one or more servers 915, and optionally, supported by another computation device, for example, a data memory, a router, a load balancer, or another device. The execution device 910 may be arranged in a physical station or be distributed to a plurality of physical stations. The execution device 910 may use data in a data storage system 950 or invoke program code in a data storage system 950, to implement steps of the method disclosed with reference to the embodiments of this application.

Users may operate respective user equipment (such as a local device 901 and a local device 902) of the users to interact with the execution device 910. Each local device may indicate any computation device, for example, a personal computer, a computer work station, a smartphone, a tablet computer, a smart camera, a smart car, or another type of cellular phone, a media consumption device, a wearable device, a set-top box, or a game console.

The local device of each user may interact with the execution device 910 by using a communications network of any communications mechanism/communications standard. The communications network may be a wide area network, a local area network, a point-to-point connected network, or any combination thereof.

In another implementation, one or more aspects of the execution devices 910 may be implemented by each local device. For example, the local device 901 may provide local data for the execution device 910 or feedback a computation result.

It should be noted that all functionalities of the execution device 910 may be implemented by the local device. For example, the local device 901 may implement a function of the execution device 910 and provides a service for a user of the local device 901, or provides a service for a user of the local device 902.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

We claim:

1. A method for managing network traffic in a communication network, the method comprising:
   receiving, by a controller node from a traffic forecasting model, a predictive mean of network traffic demand, an aleatoric uncertainty ($\sigma_n^2$) associated with the network traffic demand and an epistemic uncertainty ($\sigma_m^2$) associated with the network traffic demand;
   reserving, by the controller node, network resources based on a function of the predictive mean ($\mu$), the aleatoric uncertainty ($\sigma_n^2$) and the epistemic uncertainty ($\sigma_m^2$), and configuring tunnels with resource reservations based on the function; and
   varying, by the controller node, a sampling frequency of network statistics for a specific time-period or a network flow, the varying of the sampling frequency at least in part based on the epistemic uncertainty ($\sigma_m^2$).

2. The method according to claim 1, further comprising determining, by the controller node, a forecasting and planning horizon based on one or more of the epistemic uncertainty ($\sigma_m^2$) and the aleatoric uncertainty ($\sigma_n^2$) such that an overall weighted uncertainty of the traffic forecasting model is below a threshold, the forecasting and planning horizon indicative of a time period for which the traffic forecasting model is applicable.

3. The method of claim 1,
wherein the varying of the sampling frequency is at least in part determined based on a threshold associated with the epistemic uncertainty.

4. The method according to claim 3,
wherein the sampling frequency is increased upon determination that the epistemic uncertainty is greater than the threshold and the sampling frequency is decreased upon determined that the epistemic uncertainty is lower than the than the threshold.

5. The method according to claim 3,
wherein the threshold is dynamic.

6. The method according to claim 1,
wherein the traffic forecasting model receives the network statistics from a traffic engineering (TE) database (TE-DB), the network statistics collected from the communication network.

7. The method according to claim 1,
wherein the varying of the sampling frequency includes updating a TE database (TE-DB) containing the network statistics collected from the communication network.

8. The method according to claim 1,
wherein the controller node utilizes a constrained shortest path first (CSPF) module and a configuration and management system (CMS), wherein setting resource reservations includes utilizing the CSPF module and the CMS to configure the tunnels with resource reservations based on the function.

9. The method according to claim 1,
wherein the network statistics are transmitted from a TE database (TE-DB) to an offline training and model search module for training of the traffic forecasting model.

10. The method according to claim 1,
wherein the traffic forecasting model is a Bayesian or probabilistic traffic forecasting model.

11. The method according to claim 1,
wherein the function is defined by $\mu + \alpha \sigma_m^2 + \beta \sigma_n^2$ wherein each of $\alpha$ and $\beta$ is a scalar coefficient.

12. The method according to claim 2,
wherein the overall weighted uncertainty is defined by $\gamma_1 \sigma_m^2 + \gamma_2 \sigma_n^2$ wherein each of $\gamma_1 + \gamma_2$ is a scalar coefficient.

13. An apparatus for managing network traffic in a communication network, the apparatus comprising:
   at least one processor; and
   at least one machine-readable medium storing machine executable instructions which when executed by the at least one processor configure the apparatus to:
   receive from a traffic forecasting model, a predictive mean of network traffic demand, an aleatoric uncertainty ($\sigma_n^2$) associated with the network traffic demand and an epistemic uncertainty ($\sigma_m^2$) associated with the network traffic demand;
   reserve network resources based on a function of the predictive mean ($\mu$), the aleatoric uncertainty ($\sigma_n^2$) and the epistemic uncertainty ($\sigma_m^2$), and configuring tunnels with resource reservations based on the function; and
   vary a sampling frequency of network statistics for a specific time-period or a network flow, the varying of the sampling frequency at least in part based on the epistemic uncertainty ($\sigma_m^2$).

14. The apparatus according to claim 13,
wherein the machine executable instructions when executed by the at least one processor further configure the apparatus to determine a forecasting and planning horizon based on one or more of the epistemic uncertainty ($\sigma_m^2$) and the aleatoric uncertainty ($\sigma_n^2$) such that overall weighted uncertainty of the traffic forecasting model is below a threshold, the forecasting and planning horizon indicative of a time period for which the traffic forecasting model is applicable.

15. The apparatus according to claim 13,
Wherein the varying of the sampling frequency is at least in part determined based on a threshold associated with the epistemic uncertainty.

16. The apparatus according to claim 15,
wherein the sampling frequency is increased upon determination that the epistemic uncertainty is greater than the threshold and the sampling frequency is decreased upon determined that the epistemic uncertainty is lower than the than the threshold.

17. The apparatus according to claim 15,
wherein the threshold is dynamic.

18. The apparatus according to claim 15,
wherein the traffic forecasting model receives the network statistics from a traffic engineering (TE) database (TE-DB), the network statistics collected from the communication network.

19. The apparatus according to claim 15,
wherein the varying of the sampling frequency includes updating a TE database (TE-DB) containing the network statistics collected from the communication network.

20. The apparatus according to claim 13,
Wherein the machine executable instructions when executed by the at least one processor further configure the apparatus to utilizes a constrained shortest path first (CSPF) module and a configuration and management system (CMS), wherein setting resource reservations includes utilizing the CSPF module and the CMS to configure the tunnels with resource reservations based on the function.

21. The apparatus according to claim 13,
wherein the network statistics are transmitted from a TE database (TE-DB) to an offline training and model search module for training of the traffic forecasting model.

22. The apparatus according to claim 13,
wherein the traffic forecasting model is a Bayesian or probabilistic traffic forecasting model.

23. The apparatus according to claim 13,
wherein the function is defined by $\mu+\alpha\sigma_m^2+\beta\sigma_n^2$, wherein each of $\alpha$ and $\beta$ is a scalar coefficient.

24. The apparatus according to claim 14,
wherein the overall weighted uncertainty is defined by $\gamma_1\sigma_m^2+\gamma_2\sigma_n^2$, wherein each of $\gamma_1+\gamma_2$ is a scalar coefficient.

25. A non-transitory computer-readable medium storing machine executable instructions which when executed by a processor of a device for managing network traffic in a communication network, configure the device to:
receive by a controller node from a traffic forecasting model, a predictive mean of network traffic demand, an aleatoric uncertainty associated with the network traffic demand and an epistemic uncertainty ($\sigma_n^2$) associated with the network traffic demand;
reserve, by the controller node, network resources based on a function of the predictive mean ($\mu$), the aleatoric uncertainty ($\sigma_n^2$) and the epistemic uncertainty ($\sigma_m^2$), and configuring tunnels with resource reservations based on the function; and
vary, by the controller node, a sampling frequency of network statistics for a specific time-period or a network flow, the varying of the sampling frequency at least in part based on the epistemic uncertainty ($\sigma_m^2$).

* * * * *